United States Patent [19]

Seegers et al.

[11] Patent Number: 6,036,317

[45] Date of Patent: Mar. 14, 2000

[54] METHOD OF SPECTRAL OR COLORIMETRIC CHARACTERIZATION OF A SELF-ILLUMINATING IMAGING SYSTEM

[76] Inventors: Björn Seegers, Tilsiterstrasse 1, 48161 Munster; Thorsten Braun, Spechtweg 8, 48432 Rheine-Mesum, both of Germany

[21] Appl. No.: 09/201,964

[22] Filed: Dec. 1, 1998

[30] Foreign Application Priority Data

Dec. 15, 1997 [DE] Germany .................. 197 55 656

[51] Int. Cl.[7] ....................................... A61B 3/02

[52] U.S. Cl. ................................ 351/243; 600/558

[58] Field of Search ..................... 351/239, 242, 351/243, 246, 224; 600/558

[56] References Cited

U.S. PATENT DOCUMENTS

| | | | |
|---|---|---|---|
| 4,765,731 | 8/1988 | Williams | 351/243 |
| 5,297,559 | 3/1994 | Severns | 600/558 |
| 5,883,692 | 3/1999 | Agonis et al. | 351/224 |

*Primary Examiner*—George Manuel
*Attorney, Agent, or Firm*—Cummings & Lockwood

[57] ABSTRACT

The invention relates to a method of spectral or colorimetric characterisation of a self-illuminatng imaging system, in which the imaging system produces a color field which is matched visually with a reference color field, wherein a transparent color filter film with known spectral or colorimetric reference values which covers a reference color area of the imaging system is used as a reference color field. The invention also provides for the use of the method of spectral or colorimetric characterisation of a self-illuminating imaging system for calibration of the imaging system.

6 Claims, No Drawings

METHOD OF SPECTRAL OR COLORIMETRIC CHARACTERIZATION OF A SELF-ILLUMINATING IMAGING SYSTEM

BACKGROUND OF THE INVENTION

The invention relates to a method of spectral or colorimetric characterisation of a self-illuminating imaging system, in which the imaging system produces a color field which is matched visually with a reference color field.

Self-illuminating imaging systems should be understood to include in particular computer monitors, televisions, large image projectors and the like. Spectral or colorimetric characterisation denotes the spectral or colorimetric description of the current imaging properties of an imaging system which for example can also consist of a combination of the actual monitor with driver software and/or graphics card.

Nowadays for characterisation of color monitors special colorimeters are usually used which are equipped either with filters adapted to the sensitivity of the eye (frequently designated as three-area or tristimulus colorimeters) or spectral sensors (in spectral photometers). So-called color profiles are then produced with the aid of the measurement data.

However, the known colorimeters have the disadvantage that the illumination conditions of the monitor environment are not taken into account in the encased colorimeter. Also, in the less expensive measuring devices the measurement geometry does not correspond approximately to the spherical shape of the human eye.

A relatively economical and simple method is represented by visual matching with color sample fields, in which the color sample fields are held alongside the imaging system to be examined in order that a color field produced on the imaging system can then be appropriately matched. However, this known method only constitutes an approximate solution, since for good matching a sufficient illumination of the color sample field on the one hand and the least possible incidence of light onto the monitor on the other hand would be necessary, which however cannot be achieved because the color sample fields must be kept in the immediate proximity of the monitor and of the color field produced thereby.

Furthermore, metameric effects are produced due to the variable illumination of the color sample field and self-illuminating imaging system.

SUMMARY OF THE INVENTION

The object of the invention, therefore, is to provide a very simple and economical method, which is nevertheless as precise as possible, of spectral or colorimetric characterisation of a self-illuminating imaging system.

According to the invention this object is achieved by the features of Claim 1.

The method according to the invention is based on the following method steps of using a reference color field constructed as a transparent color filter film and having known spectral or colorimetric reference values, producing a reference color area on the imaging system, covering at least a part of the reference color area with the transparent color filter film, producing a color field on the imaging system in the vicinity of the area covered by the transparent color filter film, visually matching the color field until the color impression of this color field corresponds to the color impression of the color signal generated by the transparent color filter film, and comparing the resulting colorimetric values of the matched color field with the spectral or colorimetric reference values of the reference color field for spectral or colorimetric characterization of the imaging system.

In a preferred embodiment the steps b) to c) are repeated with further transparent color filter films which differ from the first color filter film. In the method according to the invention falsifying influences on the measurement, which result from the fact that the measurement geometry is accommodated in a convention encased colorimeter which as a rule deviates from the real viewing conditions, are excluded. The method according to the invention in particular also takes account of ambient parameters, such as for example the ambient light.

Expensive colorimeters are designed so that they simulate the human perception system as closely as possible. The method according to the invention directly utilises the outstanding color-comparing property of the eye, in that the matching of the color field produced by the imaging system with the color impression of the color signal generated by the transparent color filter film takes place visually.

In contrast to visual matching with color sample fields, in the method according to the invention only those ambient parameters are taken into account which are actually useful in viewing self-illuminating imaging systems.

The method according to the invention can be used particularly advantageously in the calibration of self-illuminating imaging systems, wherein the imaging system is adjusted on the basis of the outcome of the comparison of the resulting colorimetric values of the matched color field with the spectral or colorimetric reference values of the reference color field.

Further embodiments of the invention are the subject matter of the subordinate claims.

DETAILED DESCRIPTION OF THE PREFERRED EMBODIMENTS

One embodiment and further aspects of the invention are described in greater detail below.

According to the invention at least one transparent color filter film is used as reference color field. However, it is preferable to use three films which are transparent in three different parts of the visible spectrum and thus serve as RGB filters. These color filter films are first of all measured in a transmission colorimeter in order to establish their spectral or colorimetric filter properties as spectral or colorimetric reference values.

The imaging system, which may for example be a computer monitor, a television, a large image projector or the like, is first of all calibrated with a suitable black and white point.

The actual method of spectral or colorimetric characterisation of the self-illuminating imaging system is controlled by a suitable application program which first of all produces a reference color area, for example a neutral white, which is then at least partially covered by one of the color filter films. In the case of a color filter film which is transparent in the red, green or blue part of the spectrum a red, green or blue color impression is generated for the viewer by the filter effect of the film (subtractive color mixing).

The application program then produces a color field directly alongside the area covered by the transparent color filter film. In the next step a visual matching of this color field with the color signal generated by the transparent color filter film takes place. With the aid of the application program, in the color field which is produced a suitable combination of the three control signals Red, Green and Blue of the imaging system are sought in additive color mixing which produce the same color impression which is generated subtractively by the filter function of the color filter film. In this case the eye is used as a vary sensitive and reliable instrument for comparison. The RGB combination which is found is stored.

If no RGB combination is round which corresponds precisely to the color impression of the color signal generated by the color filter film, the RGB combination can be determined with the best possible approximation.

When several transparent color filter films are used, the corresponding method steps are repeated with the next color filter film.

By comparison of the resulting spectral or colorimetric values of the matched color fields with the spectral or colorimetric reference values of the reference color fields, a spectral or colorimetric characterisation of the total imaging system can be deduced.

The method of spectral or colorimetric characterisation of a self-illuminating imaging system which is described above can also be used particularly advantageously for calibration of the imaging system.

Thus for example the white point of a monitor can be calibrated by the production of neutral grey by superimposition of all the transparent color filter films and by visual matching of the generated color field on the imaging system until the color impression thereof corresponds to the neutral grey of the color filter films. The resulting spectral or colorimetric values of the matched color field then serve for setting the white point of the monitor.

In a further application the method according to the invention could also serve for setting a specific light intensity of the monitor.

Although the method of spectral or colorimetric characterisation of a self-illuminating imaging system has been described with respect to a preferred embodiment, it is apparent that modifications and changes can be made thereto without departing from the spirit and scope of the invention as defined by the appended claims.

We claim:

1. A method of spectral or colorimetric characterisation of a self-illuminating imaging system in which the imaging system produces a color field which is matched visually with a reference color field, comprising:

a) using a reference color field constructed as a transparent color filter film and having known spectral or colorimetric reference values;

b) producing a reference color area on the imaging system;

c) covering at least a part of the reference color area with the transparent color filter film;

d) producing a color field on the imaging system in the vicinity of the area covered by the transparent color filter film;

e) visually matching the color field until the color impression of the color field corresponds to the color impression of the color signal generated by the transparent color filter film; and f) comparing the resulting spectral or colorimetric values of the matched color field with the spectral or colorimetric reference values of the reference color field for spectral or colorimetric characterisation of the imaging system.

2. A method according to claim 1, wherein steps b) to e) are repeated with further transparent color filter films which differ from the first color filter film.

3. A method according to claim 1, wherein the spectral or colorimetric reference values of the color filter film are determined with a transmission colorimeteric/spectrophotometer.

4. A method according to claim 1 wherein at least three color filter films are used which are transparent in three different parts of the visible radiation.

5. A method according to claim 1, further comprising the step of utilizing said method for calibration of the self-illuminating imaging system.

6. A method according to claim 5, wherein the calibration of the self-illuminating imaging system is carried out on the basis of a comparison of the resulting spectral or colorimetric reference values of the matched color field with the spectral or colorimetric reference values of the reference color field.

* * * * *